Figures 3, 4:
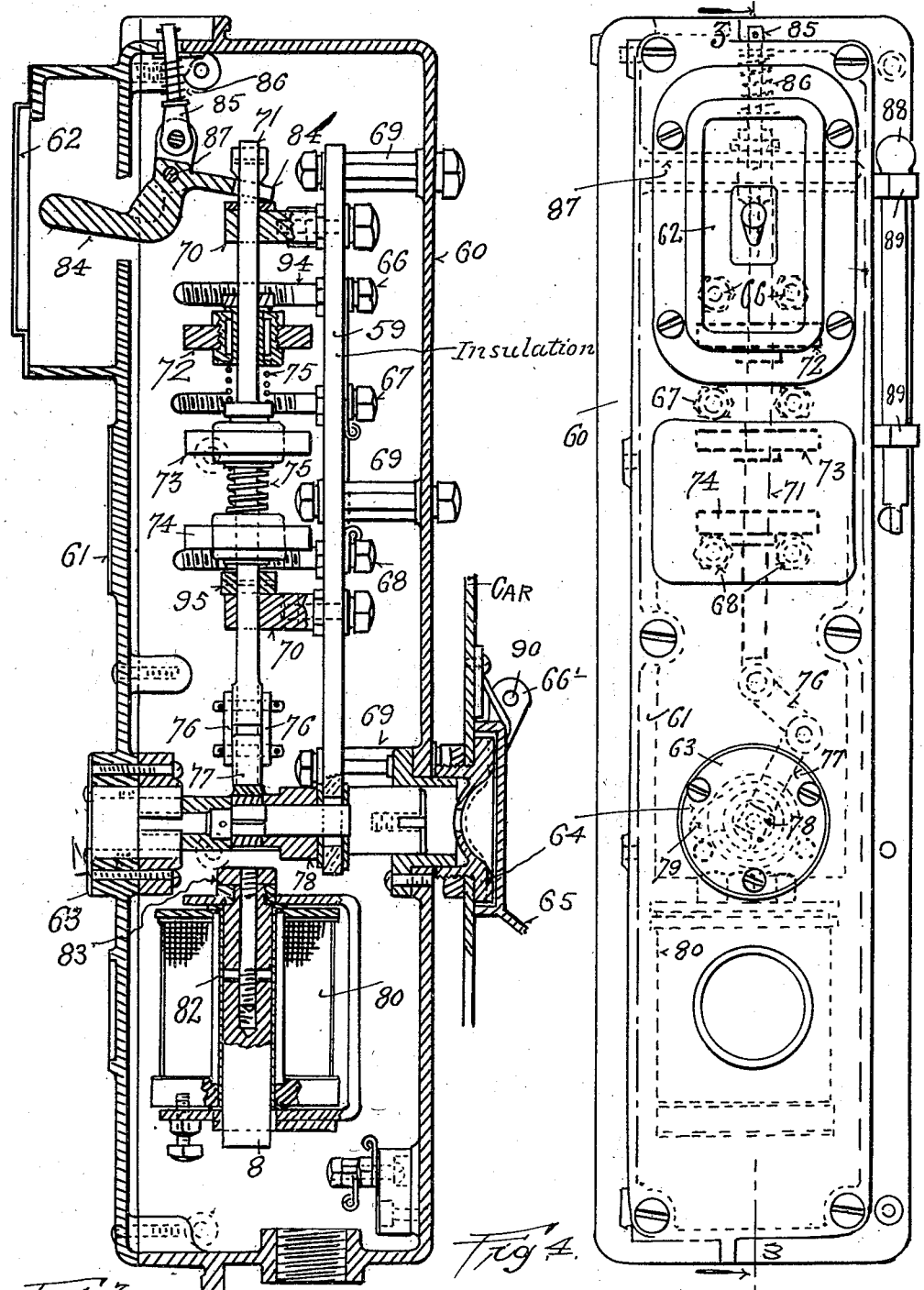

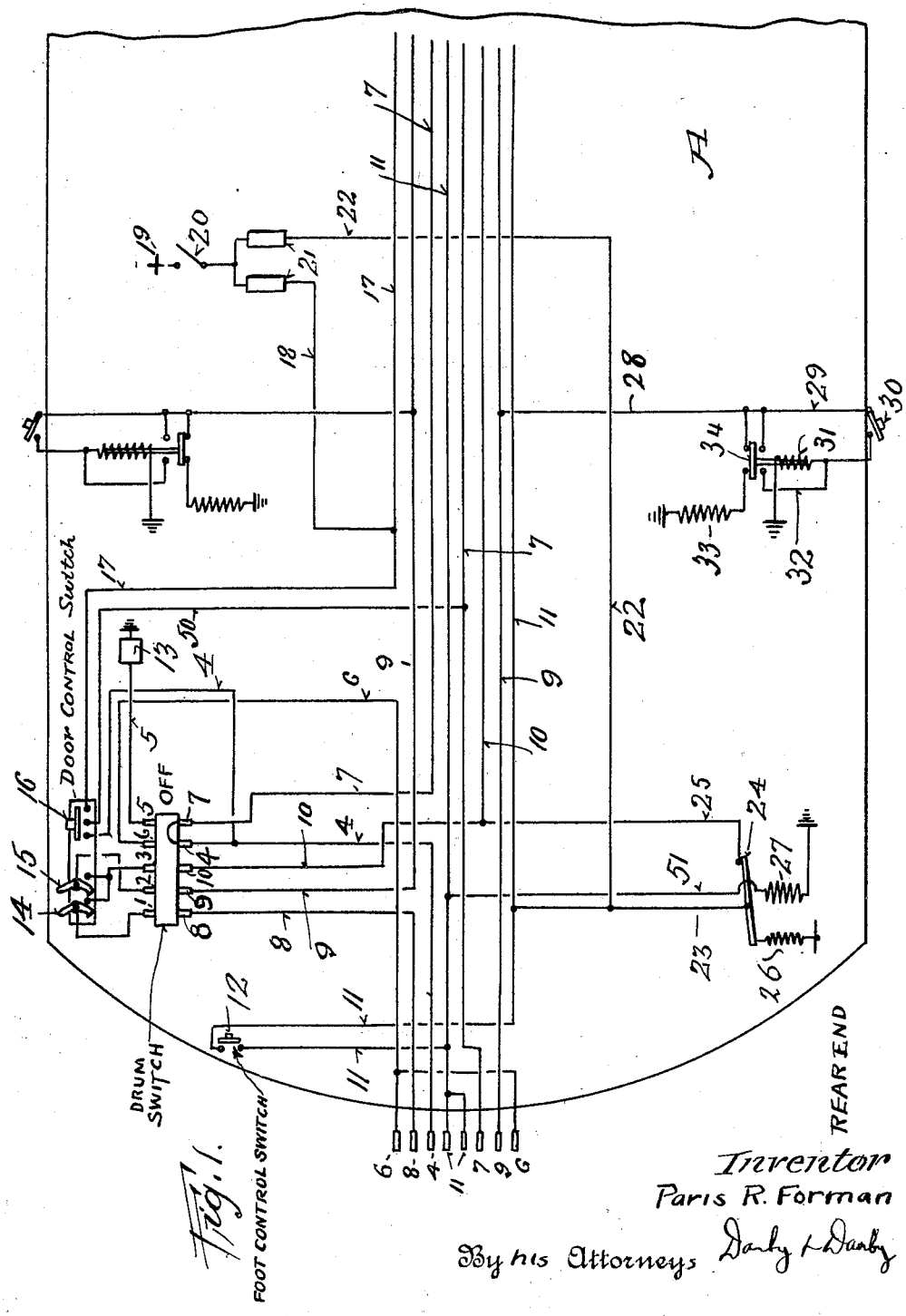

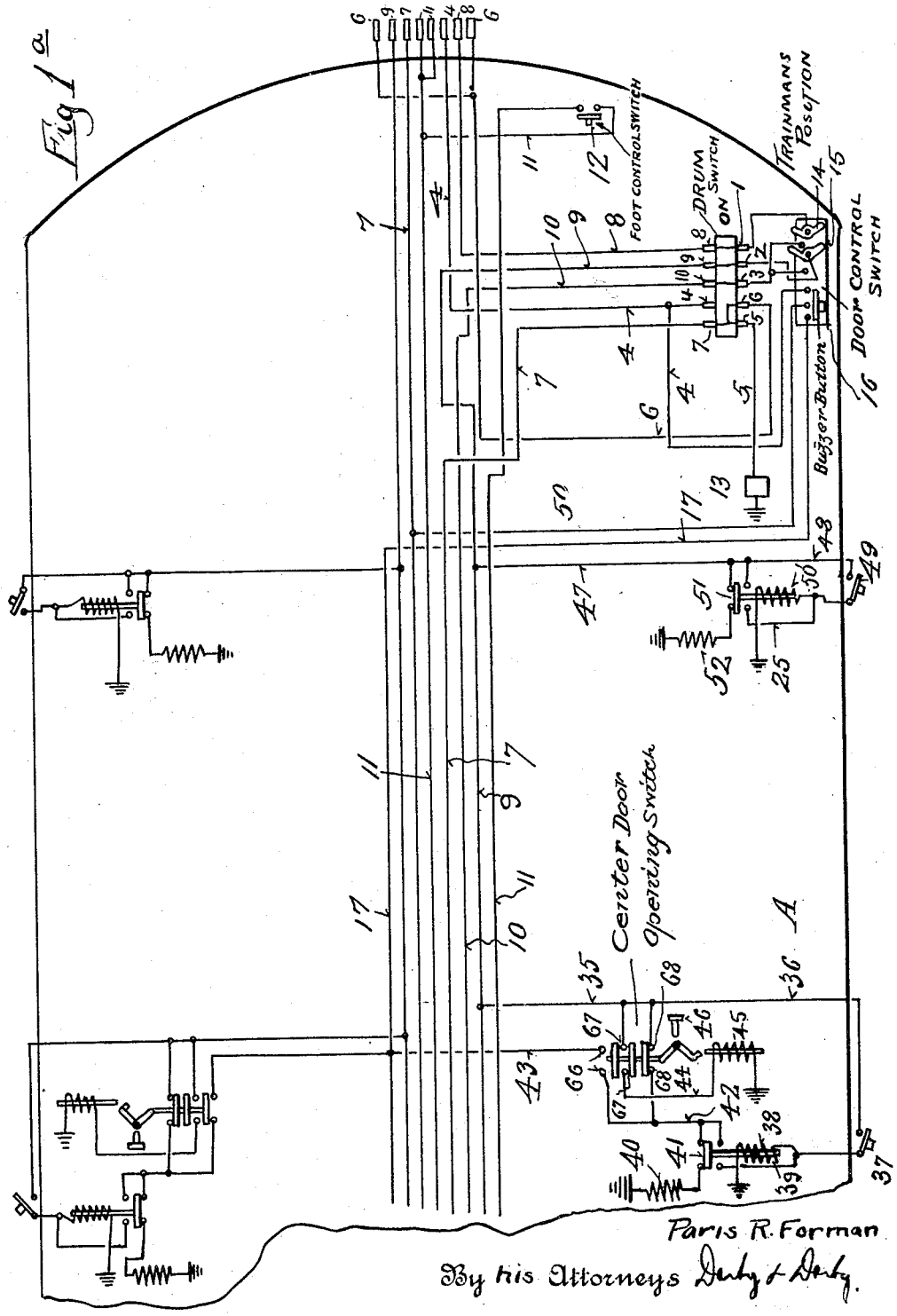

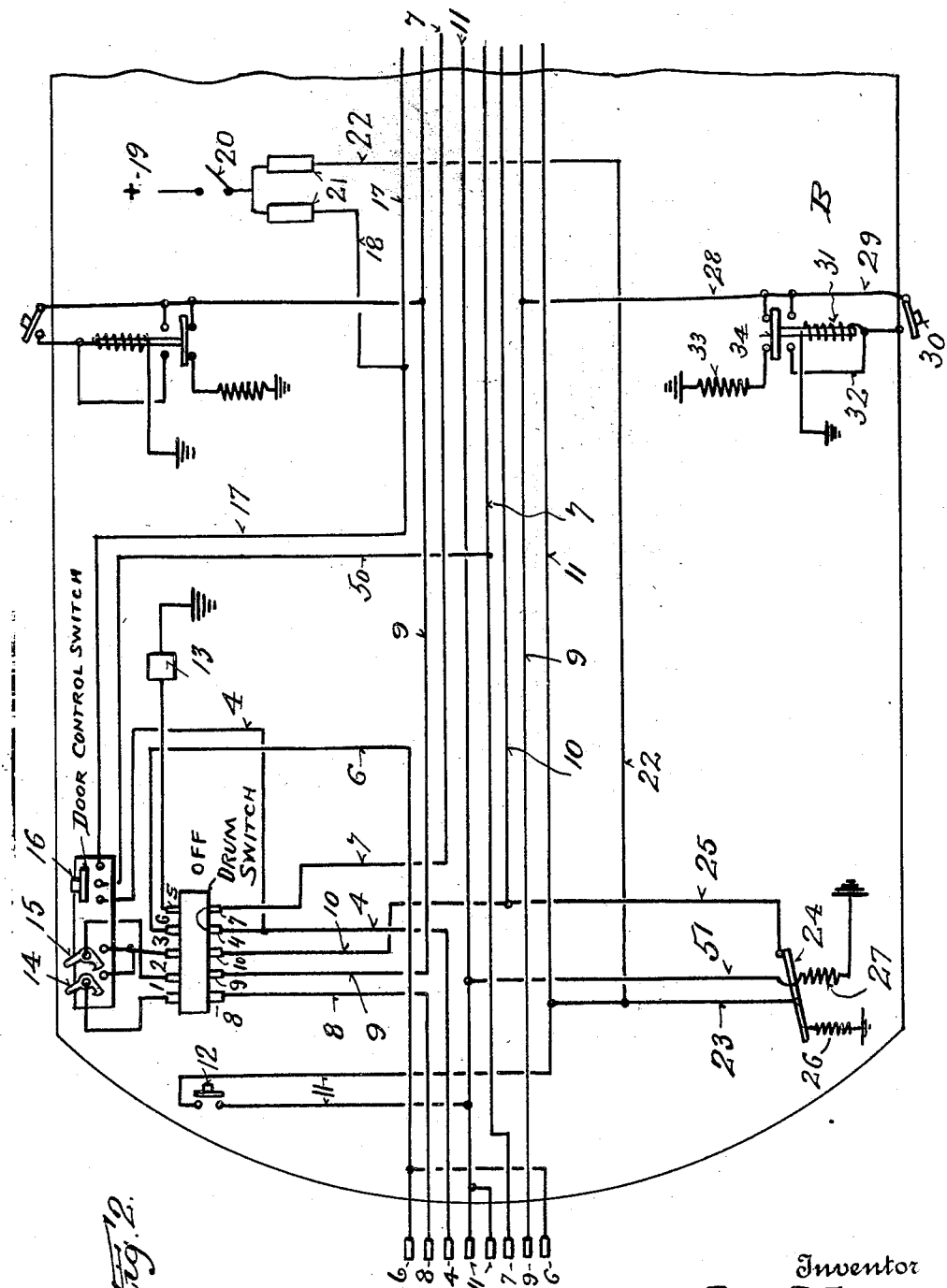

July 15, 1930.  P. R. FORMAN  1,770,484

VEHICLE DOOR CONTROL SYSTEM

Filed Jan. 7, 1928  7 Sheets-Sheet 4

July 15, 1930.   P. R. FORMAN   1,770,484
VEHICLE DOOR CONTROL SYSTEM
Filed Jan. 7, 1928   7 Sheets-Sheet 5

Paris R. Forman
By his Attorneys
Darby & Darby.

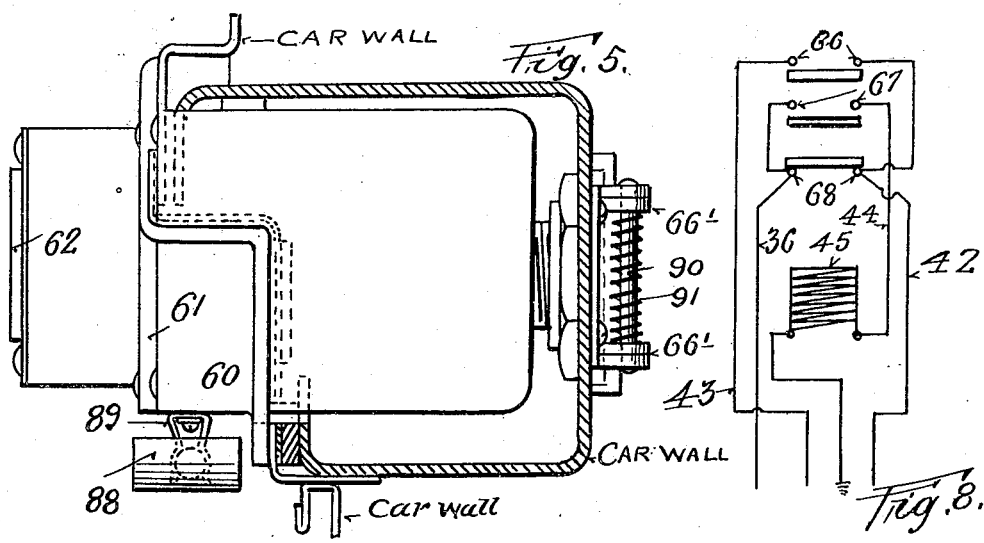
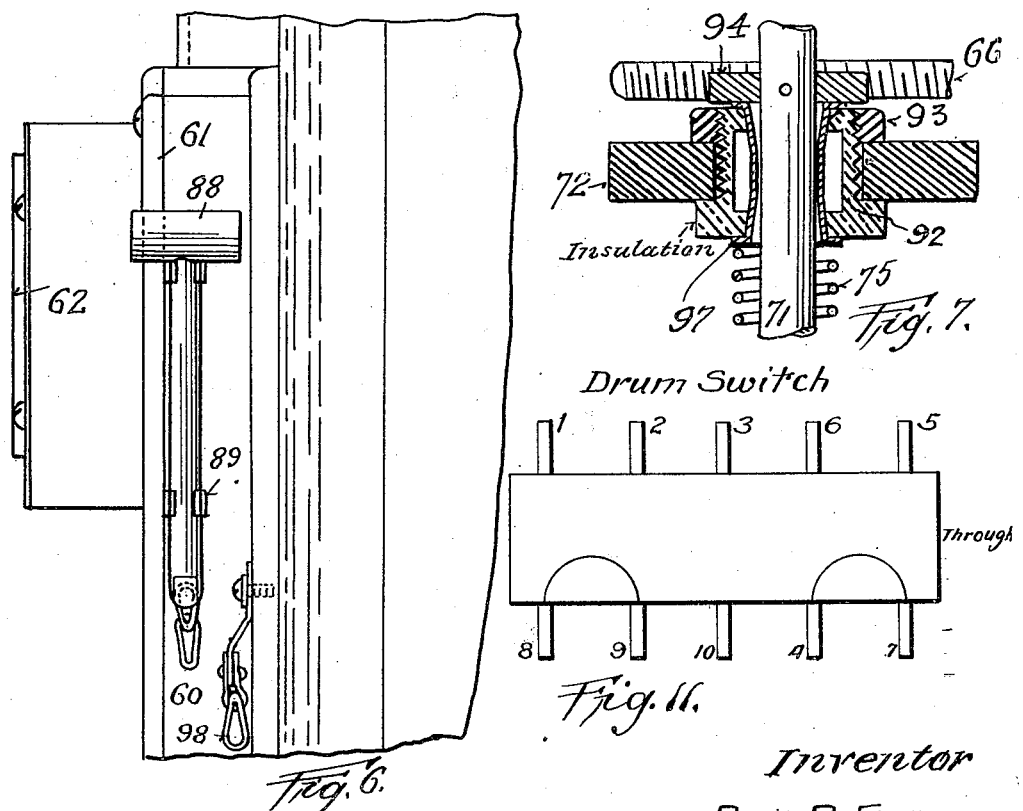

July 15, 1930.  P. R. FORMAN  1,770,484
VEHICLE DOOR CONTROL SYSTEM
Filed Jan. 7, 1928  7 Sheets-Sheet 7
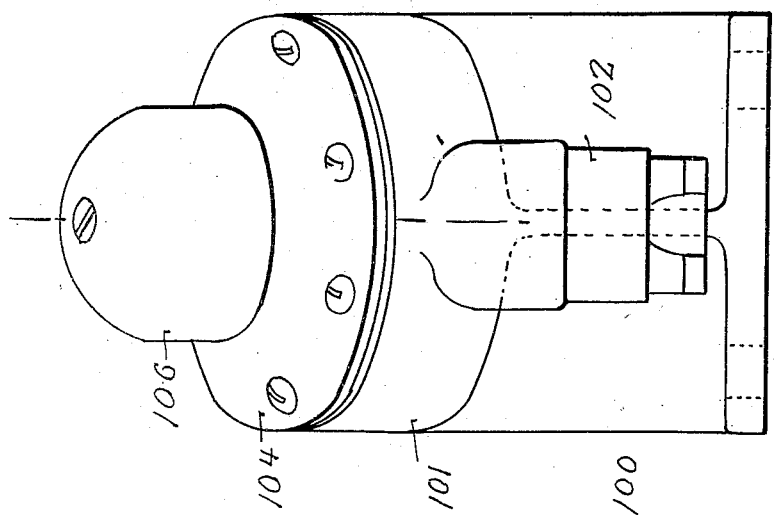
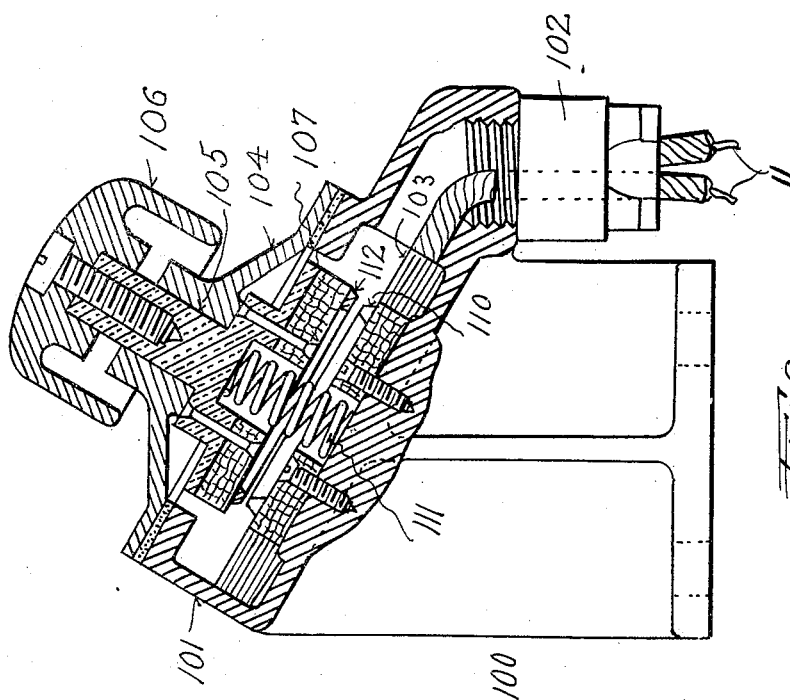
Inventor
Paris R. Forman
By his Attorneys Darby & Darby Patented July 15, 1930

1,770,484

UNITED STATES PATENT OFFICE

PARIS R. FORMAN, OF RAHWAY, NEW JERSEY, ASSIGNOR TO NATIONAL PNEUMATIC COMPANY, OF NEW YORK, N. Y., A CORPORATION OF WEST VIRGINIA

VEHICLE DOOR-CONTROL SYSTEM

Application filed January 7, 1928. Serial No. 245,198.

This invention relates in general to door control systems for operating the doors of vehicles such as street cars, subway trains, elevator trains and the like.

One of the objects of this invention is the provision of a new and novel system for operating vehicle doors in various predetermined manners.

Another object of this invention is the provision of a unitary door control system for single vehicles, such as cars, and adapted to permit the association of a plurality of cars in a train and, at the same time, to provide a system for controlling the doors of all the cars on one side of the train from one or two positions.

A further object of this invention is the provision of a door control system for trains comprising a plurality of cars in which all the doors on one side of the train may be controlled from the motorman's or the trainman's position.

A further object of this invention is the provision of a door control system of the above type in which any one of the open doors may be closed at a point exterior to the door by the platform guard.

A further object of this invention is the provision of means in a system of the above type whereby the center doors on any of the cars of the train may be opened or closed either interiorly or exteriorly of the car without affecting the other doors of the cars.

A further object of this invention is the provision of means in a system of the foregoing type in which the center doors of the vehicle may, in an emergency, be opened by a passenger.

A further object of this invention is the provision of means whereby the motorman may prevent the operation of any of the doors by either the trainman, the platform guard, or a passenger.

A further object of this invention is the provision of a new and novel door control switch to be used in conjunction with the above recited system.

A still further object of this invention is the provision of a new and novel switch for controlling the center doors of the vehicle.

These and many other objects as will appear from the following disclosure are secured by means of this invention.

This invention resides substantially in the combination, construction, arrangement, relative location of parts and circuital connections all as will more fully appear from the description when taken in connection with the drawings.

Referring to the drawings which have been given for the purpose of illustrating the principles of this invention, Figures 1, 1ª, 2 and 2ª represent, when placed end to end, the circuit connections of this invention as applied to a 2-car train.

Figure 3 is a vertical cross-sectional view of the center door control switch taken on the line 3—3 of Figure 4 showing the switch applied to the car wall, Figure 4 is a front elevational view of this switch, Figure 5 is a top plan view of the switch applied to the car wall, Figure 6 is a side elevational view of the elements shown in Figure 5, Figure 7 is an enlarged elevational view of a detail of the switch construction, Figure 8 is a wiring diagram of this switch, Figure 9 is a cross-sectional view through the foot switch, and Figure 10 is a side elevational view of this switch.

Fig. 11 is a diagrammatic view of the drum switch in "through" position.

There are at present many well known systems of door control for cars which are used either alone or, together, to provide a train. Many of these systems are complicated and it is the purpose of this invention to provide a relatively simple door control system having a number of features which have been pointed out above and which will be more clearly explained in connection with the following disclosure. By means of the arrangement of this invention all the doors on a number of cars coupled together to constitute a train on one side of the train depending upon the direction of travel can be opened simultaneously from one or two positions. For the purposes of this disclosure Figures 1, 1ᵃ, 2 and 2ᵃ have been provided so that when they are taken together they illustrate the wiring connections for a 2-car train. It is, of course, to be understood that the principles of this invention are adapted for use in a train comprising any practical number of cars. While the present disclosure has been illustrated in connection with pneumatic door operating devices under electrical control it is to be understood that the principles of the invention are applicable to entirely electrical door operating systems, entirely pneumatically operated systems, or to combinations of electrical and pneumatic devices.

Referring to the drawings and particularly to Figures 1, 1ᵃ, 2 and 2ᵃ there has been shown a 2-car train comprising the cars A and B. When the sheets of drawings disclosing these figures are placed end to end so that the figures read from the left to the right, 1, 1ᵃ, 2 and 2ᵃ, the forward end of the train will be as indicated at the extreme right, and the rear end of the train will be at the extreme left so that car B is the first car and car A is the second car. The motorman's station has been indicated on the drawing by the legend "Motorman's position" and the trainman's station has been indicated by the legend "Trainman's position". In other words, the motorman is at the front right hand end of the first car and the trainman is located at the front right hand end of the rear car regardless of the number of cars in the train. Each car is provided at diagonal corners with a multicontact switch which has been indicated by the legend "Drum switch". Each of these drum switches is provided with the contacts 1, 2, 3, 5 and 6 on one side of the drum and with the contacts 8, 9, 10, 4 and 7 on the other side of the drum. By means of this switch it is possible to arrange the circuits on the various vehicles to adapt the cars for use in a train of any length. This switch has three positions, namely, "On" "Off" and "Through". With the drawings arranged as described above and considering the train to be proceeding to the right the drum switch on the forward right hand end of the first car will be in the position "on". In this position as indicated on the drawings contacts 1 and 8 are connected together, contacts 2 and 9 are connected together, contacts 3 and 10 are connected together, and contacts 5 and 6 are connected to contact 7. The drum switch on the last car of the train located at its forward right hand end is also in the same position as indicated on car A of the drawings. The drum switches at the rear left hand end of the first and last cars of the train are in the position "off" in which position contacts 4 and 7 are connected together. It may be pointed out here that where the train comprises more than two cars all the cars intermediate the first and last car have the drum switches at the forward right hand end thereof connected in the "through" position in which case contacts 8 and 9 are connected together and contacts 4 and 7 are connected together as shown in Fig. 11. The drum switches at the rear left hand end of all of the cars intermediate the first and last have their drum switches in the "off" position in which, as stated before, contacts 4 and 7 are connected together. It may be pointed out here that an effort has been made by using the same reference numeral on the various wires comprising a circuit to keep that circuit separate from the others. At the rear end of each car a terminal connector is employed having the terminals 6, 8, 4, 11, 7, 9 and 6 and the terminal connector at the forward end of each car is provided with the terminals, 6, 9, 7, 11, 4, 8 and 6. At each end of each car provided with the drum switch a "door control switch" is mounted as shown in the drawings. Each of these "door control switches" is provided with two single pole switches 14 and 15 and a push button 16. Likewise each end of each car is provided with a single pole foot or other type of switch 12. Each end of each car is also provided with a buzzer or other signal device 13. Each car is provided with a door control de-energizing relay 27.

It will be understood that in the system disclosed each car is provided with three doors on each side thereof, one at each end and one at the center and any suitable type of fluid pressure operated device of which there are many well known types in the art may be employed for operating the doors. These fluid pressure operated devices are, as is usual, controlled by means of a magnet valve which has been indicated at 33, 40 and 52. In this type of device when the windings of these magnet valves are energized fluid pressure is admitted to the fluid pressure operated device to open the doors and when the winding is de-energized the valve controls the fluid pressure operated device to permit it to close the doors. It should be noted that since the description of the operation of this device has been limited to the right hand side thereof no effort has been made to number and describe the corresponding devices on the left hand side since they are exactly the same as those on the right hand side and would be employed when the train is proceeding in the opposite direction, namely, to the left. Each of the center doors of the cars is provided with a switch indicated by the legend "Center door opening switch". The various wires running from the drum switches and extending throughout the length of the car have been given the same reference numerals as the contacts on the drum switches to which they are connected and the terminals in the terminal connectors. The positive side of the current source is connected at 19 and the current travels through the single pole switch 20 and the fuses 21 to supply current to the wire 17 through 18 and to the wire 23 through the wire 22. The foot control switch 12 has one terminal connected by the wire 11 to the wire 11 connected to the terminals 11. The other terminal of this switch is connected through the wire 11 which runs through the length of the car and connects to the other foot switch 12. A wire 23 connects the wire 11 to the switch arm 24 which is held in the position shown in the drawings by means of the spring 26. A wire 25 connects the other terminal of this switch to the wires 10 and contact 10 on the drum switch. The winding 27 operates the switch arm with said winding which together may be termed the "door control de-energizing relay" same being connected at one end to ground and at the other end through the wire 51 to the wire 11 connected to the contacts 11 in the terminal connector. When the winding 27 is energized as will be described later it attracts the switch arm 27 to break the circuit connected thereto. The signal device 13 is connected by means of the wire 5 to the terminal 5 on the drum switch. The middle contact of the push button 16 (with the exception of push button 16 at the forward end of car B) is connected by wire 50 to the wire 7 which runs to the contact 7 on the drum switch at the forward end of the car. The contact nearest the single pole switch 15 of the push button 16 is connected by the wire 4 to the contact 4 of the drum switch. The third contact of the push button 16 is connected by the wires 17 and 18 to the current source 19.

The circuit to the door control magnet valve at the rear end of each car includes a relay having a winding 31 which is grounded at one end and is connected at the other end to one terminal of the push button switch 30. The other terminal of the push button switch 30 is connected by the wires 29 and 28 to the wire 9 which connects with contact 9 on the drum switch at the right hand forward end of the car. One of these push button switches is provided on the exterior of the vehicle adjacent each of the doors and is intended to be operated by the platform or station guard for a purpose to be described later. The relay winding 31 controls a switch 34 which in its normal position completes the circuit to the winding 33 and when the winding 31 is energized switch 34 breaks the circuit to the winding 33 and completes a holding circuit for itself through the wire 32.

Referring to the mechanism connected to the center door of each vehicle the magnet valve winding 40 is shown grounded at one end and connected through the relay switch 41, wire 42, contacts 66 and wire 43 to wire 17. As before, the switch 41 is controlled by a magnet winding 38 grounded at one end and connected at the other end to the push button switch 37 mounted on the outside of the car. The other terminal of the switch 37 is connected through the wires 36 and 35 to the conductor 9 which connects with contact 9 on the drum switch at the right hand forward end of the car. When the winding 38 is energized by closing the switch 37 the circuit to the winding 40 is broken and a holding circuit for the winding 38 is provided through the wire 39. The center door opening switch has in addition to the contacts 66, the contacts 67 and 68. This switch is intended to be mechanically operated either interiorly or exteriorly of the vehicle by means of a key which key when inserted and turned straightens out the knuckle joint to break the circuit at the contacts 68 and complete the circuit at the contacts 66 and 67. In the diagrammatic view shown in Figures 1ª and 2ª the key for operating this switch is indicated at 46. It may be noted here that a detailed description of the construction of this center door opening switch will be given. In the normal position of the center door opening switch as shown, circuit is completed at contacts 68 and broken at contacts 66 and 67. When the knuckle joint in this switch is straightened out by means of the key 46, circuit is broken at the contact 68 and completed at contacts 66 and 67 and as a result a new circuit is made for the winding 40 and the circuit for the winding 45 is completed. The operation of these circuits will be described later. The equipment for the forward right hand door of each car is similar to that for the door at the rear end of the car and comprises the magnet valve winding 52 connected through the switch 51 and wire 47 to the conductor 9 (same as before). The switch 51 is controlled by the magnet winding 50' which is grounded at one end and connected through the push button switch 49 by wires 48 and 47 to the conductor 9 (same as before). When the winding 50' is energized the circuit for the winding 52 is broken and a holding circuit for the winding 50' is completed through the wire 25. The foregoing description relates to the various devices which are employed on each car in the train.

The operation of these devices will now be given. Assuming, as before, that with the drawings arranged as pointed out above the train is moving forward to the right, as the train pulls into a station and stops the trainman closes the switch 15 at the trainman's position to complete a circuit as follows. From the positive side of the current source 19 (Figure 1) switch 20 (closed), fuse 21, wire 22, wire 23, switch arm 24, wire 25, conductor 10 extending to contact 10 on the drum switch at the "trainman's position", through the drum switch to contact 3, thence through switch 15 back to contact 2 on the drum switch, through the drum switch to contact 9, wire 9 to wire 28, through relay switch 34 and through the magnet valve winding 33 to ground. This energizes the winding 33 causing the magnet valve to admit fluid pressure to the fluid pressure operated device which opens the door connected thereto. At the same time the current flows from the conductor 9 through wire 35, through the contacts 68, wire 42, relay switch 41 and through the winding 40 to ground. This causes the center door to open. Likewise current flows from conductor 9, through wire 47, relay switch 51 and through the winding 52 to ground. This causes the forward right hand door of the rear train to open. The trainman also closes switch 14 to complete a circuit as follows. From the positive side of the current source 19 on car A, switch 20 (closed), fuse 21, wire 22, wire 23, switch arm 24, wire 25, conductor 10 to contact 10 on the drum switch on the forward end of the car, through the drum switch to contact 3 and thence through switch 14 back to contact 1 on the drum switch, through the drum switch to contact 8, wire 8, through the terminal 8, in the terminal connector to terminal 9, in the terminal connector on the car B and through conductor 9. Current then travels to the various door opening magnets on car B as follows. From conductor 29 to wire 28, relay switch 34 and thence through the winding 33 to ground. This causes the rear door on car B to open. The center door on car B opens as follows. Current flows from conductor 9 to wire 35, through the contacts 68 of the center door opening switch, to wire 42, through the relay switch 41 and through the winding 40 to ground. This causes the center door to open. The forward door on car B is operated by the current flowing from conductor 9, wire 47, relay switch 51 and through the winding 52 to ground. It may again be pointed out that the foregoing description applies to a 2-car train. If intermediate cars are employed the current would travel from the last car to the first car of the intermediate cars through the various devices as described, to conductor 9 the first intermediate car. The current would then travel to the drum switch on the forward end of that car to the contact 9 and through the drum switch to the contact 8 and thence through wire 8 to the next car. It will be remembered as pointed out above that the drum switch on the forward right hand end of each of the intermediate cars would be set in position "Through" so that contacts 9 and 8 are connected together through the drum switch.

Referring again to the 2-car train all the doors are now open. If the platform guard desires for any reason to close any one of these open doors he may do so by pressing the push button switches 30, 37 or 49 adjacent the particular door which he wishes to close. Let us suppose, for instance, that he wishes to close the last door on car A. By pushing the push button switch 30 current flows through conductor 9, wire 28, wire 29, switch 30, through the winding 31 to ground. This causes the relay switch 34 to open the circuit to the winding 33 and at the same time to complete a holding circuit through the wire 32 for the winding 31. The breaking of the circuit for the winding 33 de-energizes the magnet valve and as a result the door closes without effecting the operation of any of the other doors. The same operation occurs if any of the other push buttons are closed. When all the passengers have boarded the vehicle the trainman moves the switches 14 and 15 to open position interrupting the circuits to all the magnet valve windings which causes all the doors to close. If the train should stop between stations and the motorman wishes to make it impossible for the trainman to control the doors he closes the push button switch 12 adjacent his control equipment at the forward end of the first car. The current then travels from the positive side of the current source on car B through switch 20, fuse 21, wire 22, wire 23 to conductor 11, through conductor 11 to switch 12 and back through wire 11 to conductor 11, through conductor 11 to wire 51 and through the winding 27 to ground. The energization of the winding 27 causes the switch 24 to break the circuit connected thereto which interrupts the delivery of current from the wire 22 to the wire 25 to which the door actuating devices are connected. This operation is effected with each of the door control de-energizing relays 27 on each of the cars.

When it is desired to open the center door of any of the cars independently a key 46 is inserted either from the interior or the exterior of the car to straighten out the knuckle in the center door opening switch. If this is done current flows from positive side 19 of the current source through switch 20, fuse 21, wire 18 to conductor 17, wire 43, contacts 66, wire 42, relay switch 41 and through the winding 40 to ground. As a result the winding 40 is energized to cause the center door to open. It will be understood that each center door opening switch operates the door adjacent thereto only. At the same time that the contacts 66 are closed the contacts 67 are closed so that the trainman can close the center doors before the train starts. The circuit to the winding 45 is completed through the contacts 67 and when the trainman desires to close the doors he operates switch handle 15 with a quick "on" and "off" operation. This rapid operation of the switch will not give sufficient current to open the doors but will be enough to energize the coil 45 of the center door opening switch to knock out the knuckle joint thereby closing the lower set of contacts 68 and opening the two upper sets of contacts 66 and 67 thereby interrupting the circuit to the magnet valve 40 to permit the center door to close. This quick "on" and "off" of switch 15 completes a circuit as follows: Current flows from the positive side of current source 19 through switch 20, fuse 21, wire 22, wire 23, switch arm 24, wire 25, conductor 10 to contact 10 on the drum switch, through the drum switch to contact 3, through switch 15 to contact 2, through the drum switch to contact 9, to conductor 9, wire 35, through the contacts 67, wire 44 and thence to ground through the winding 45. The energization of the winding 45 causes its armature to kick out the knuckle joint, as a result of which the circuit to the magnet winding 40 is interrupted permitting the center door to close.

When all the doors are closed the trainman may signal the motorman by energizing the buzzer 13 in the motorman's cab. This operation is effected by the trainman who pushes the button 16. Current flows from the positive side of the current source 19 through switch 20, fuse 21, wire 18, conductor 17, push button switch 16 at the "trainman's position," wire 4, conductor 4, terminal contacts 4 (car A) and 7 (car B) conductor 7 of car B to contact 7 on the drum switch at the "motorman's position" through the drum switch to contact 6 and thence through the buzzer 13 to ground via wire 5. On the signal that all the doors are closed the motorman may then proceed to the next station.

The foregoing description of the operation of the apparatus of this invention clearly illustrates the various advantageous features thereof. In order to more clearly understand the construction of the center door opening switch reference will now be made to Figs. 3 to 8 inclusive.

The center door opening switch is shown in these figures comprising the casing 60 having the removable cover 61. The upper portion of this cover is provided with a projecting casing a portion of the front of which is made in the form of a glass window 62. An opening 63 is provided in the cover through which a key may be inserted for a purpose to be described later. A similar opening is provided on the casing 60 at 64 through which a key may likewise be inserted. A cover 65 having the arms 66' mounted for rotation on the spindle 90 is provided to normally close the key opening member 64. A spring 91 (Fig. 5) tends to normally maintain the cover 65 in closed position. The device as shown in several of the figures is adapted to be mounted on the car wall so that the face having the removable cover is within the car and the key opening member 64 is mounted on the exterior wall of the car so that access may be had thereto exteriorly of the car. Mounted within the casing 60 on the posts 69 is a sheet of insulating material 59. Spaced apart and mounted on the insulating material 59 are three sets of contacts 66, 67 and 68. Each set of contacts comprises two rods as will appear from Figure 4. Also mounted on the insulating plate 59 near the top is a bearing member 70 and a similar one mounted near the bottom. A vertically slidable rod 71 is mounted in the bearings 70 for vertical movement. Mounted on the rod 71 are the three contact members 72, 73 and 74 mounted adjacent the contacts 66, 67 and 68 respectively. These contact members are mounted upon the rod 71 for movement thereon against the action of the springs 75 and are insulated from the rod itself. The contact structure comprising the contact members 72, 73 and 74 and the springs 75 are permitted sliding movement on the rod 71 against the action of the springs and are confined between the stops 94 and 95 which are keyed to the rod 71. In the normal position of this mechanism which is shown in the drawings it is pointed out that contact members 72 and 73 are normally out of engagement with their contacts and contact member 74 is normally in engagement with its contacts. Pivotally connected to the lower rod 71 are the two link members 76 which are in turn pivotally connected to the link 77 which in turn is secured to the horizontal rotatable shaft 78. This shaft is adapted to be rotated by a special key to be inserted either in the opening member 63 or the opening member 64. As shown in Figure 4 a short projecting arm 79 is also mounted on the shaft 78 for rotation with it. Mounted within the casing near the bottom is an electromagnet 80 having the movable plunger 81 to which is secured by means of the threaded rod 72, a small hammer or knocker member 83. When the magnet 80 is energized the plunger 81 is drawn upwardly and carries with it the rod 82 and hammer 83 to strike against the end of the short arm 79. When the key is inserted and the shaft 78 rotated the knuckle comprising the links 76 and 77 is straightened out so that the contact member 74 is moved out of engagement with the contacts 78 and the contact members 73 and 72 are caused to resiliently engage the contacts 67 and 66 respectively to complete circuits connected thereto. When the magnet 80 is energized the hammer 83 strikes against the end of the arm 79 to knock the knuckle joint out of a straight line and permit the switch parts to return to their normal position shown in Figure 3. Mounted near the top of the casing on a pivot pin 87 is a short lever 84 which projects through an opening in the cover 61 so as to be adjacent the glass window 62. The lever 84 is pivotally connected to a member 85 which projects through an opening in the top of the casing and is adapted to move upwardly against the action of the spring 86 when the lever 84 is pulled downwardly. The upward movement of the lever 84 causes its bifurcated end 84' to move the shaft 71 upwardly to secure the same operation of the switch member as is secured by straightening out the knuckle joint. A small iron hammer 88 is mounted on the side of the casing in the spring clips 89 and is secured to this casing by means of the chain 98 (Fig. 6). The purpose of this hammer 88 is to break the glass 82 where it is desired in the case of emergency to permit the opening of the doors by persons trapped within the car. The wiring diagram for this switch is shown in Fig. 8 and the same reference numerals have been applied to it as were used in the Figures 1 to 2ª.

An enlarged view showing the method of mounting the contact members on the rod 71 is given in Fig. 7. The contact member 72 is supported in the insulating bushing comprising the parts 92 and 93. An insulating thimble 97 encircles the shaft 71 within the bushing 92. 94 represents the upper stop pinned to the shaft 71.

The foot switch is shown in Figures 9 and 10 and comprises the bracket 100 having the integral casing 101 and mounted thereon. This casing is provided with a threaded bushing member 102 through which the wires 11 pass. Mounted within the casing is an insulating block 103 on which the contact 110 is mounted and to which one of the wires 11 is attached. The cover 104 for the casing is provided with an insulating bushing 105 having the foot button 106 attached thereto. Secured to the lower end of the bushing 105 is an insulating member 107 on which the contact 112 is mounted and to which the other wire 11 is attached. The contacts 110 and 112 are normally held out of engagement by means of the spring 111.

I am well aware that many changes in the details of construction and relative arrangement of parts will readily occur to those skilled in the art and I do not, therefore, desire to be limited to the constructions and arrangements shown for purposes of illustration but rather to the principles of my invention as they are defined in the appended claims.

What I seek to secure by United States Letters Patent is:

1. The combination with a vehicle having entrance and exit ways and barriers in said ways, of means for operating all the barriers on one side of the vehicle from a single point within the vehicle by the trainman, means adjacent each barrier for effecting the closing of each barrier independently of the other barriers and means under the control of the motorman for preventing the operation of any of the barriers.

2. The combination with a train comprising a plurality of cars, each car having a plurality of entrance and exit ways and barriers in said ways, said train having a motorman's and a trainman's position, of means at the trainman's position for opening and closing all the barriers on one side of the train and means at the motorman's position for preventing the operation of all of the barriers at will.

3. The combination with a train comprising a plurality of cars, each car having a plurality of entrance and exit ways and barriers in said ways, said train having a motorman's and a trainman's position, of means at the trainman's position for opening and closing all the barriers on one side of the train, means at the motorman's position for preventing the operation of all of the barriers at will and means on the exterior of the car adjacent each barrier for closing it after it has been opened by the trainman.

4. The combination with a vehicle having entrance and exit ways at the ends and center thereof and barriers in said ways, of means for opening and closing all of the barriers on one side of the vehicle from a single point, single means adjacent the center barrier of each car for opening said barrier from the interior or the exterior of the vehicle, and means on the exterior of the vehicle for closing said center barrier.

5. The combination with a train comprising a plurality of cars, each car having entrance and exit ways and barriers in said ways, said train having a motorman's station at one end and a trainman's station intermediate the ends, of means for opening and closing all the barriers on one side of the train, said means being controlled from the trainman's station, means for disconnecting the power source from said means and means at the motorman's position for controlling said disconnecting whereby the trainman is prevented from opening the barriers at the will of the motorman.

6. The combination with a train comprising a plurality of cars, each car having entrance and exit ways at each end and at the center and barriers in said ways, said train having a motorman's station at one end and a trainman's station intermediate the ends, of means for opening and closing all the barriers on one side of the train, said means being controlled from the trainman's station and means adjacent each center barrier for opening and closing each center barrier independently of the others either from the exterior or the interior of the car.

7. The combination with a train comprising a plurality of cars, each car having entrance and exit ways at each end and at the center, and barriers in said ways, said train having a motorman's station at one end and a trainman's station intermediate the ends, of means for opening and closing all the barriers on one side of the train, said means being controlled from the trainman's station, means adjacent each center barrier for opening and closing each center barrier independently of the others either from the exterior or the interior of the car, means controlled from the exterior of the car for closing each center barrier independently of the others and independent means at the trainman's station for closing the center barriers after they have been opened by the means adjacent each center barrier.

8. In an arrangement as described, the combination comprising a train of a plurality of cars, entrance and exit ways on each car barrier in said ways, motive means for operating said barriers, electro-magnetic means for controlling said motive means, circuits for said electro-magnetic means controlled from a single point by the trainman, and circuits including a relay, a switch for each electro-magnetic means, said switches being located on the exterior of each car adjacent each door whereby each door may be closed independently of each other from a point exterior to the car by deenergizing the electro-magnetic means therefor, means in the circuits for said electro-magnetic means for interrupting said circuits and a single control at the motorman's station for controlling said interrupting means to prevent the operation of any of the doors by the trainman when desired.

In testimony whereof I have hereunto set my hand on this third day of January A. D. 1928.

PARIS R. FORMAN.